United States Patent
Egan et al.

(10) Patent No.: US 8,770,837 B2
(45) Date of Patent: Jul. 8, 2014

(54) FATIGUE RESISTANT THERMOWELL AND METHODS

(75) Inventors: William C. Egan, Menasha, WI (US); Robert Schultz, Appleton, WI (US)

(73) Assignee: Nuovo Pignone S.p.A., Florence (IT)

( * ) Notice: Subject to any disclaimer, the term of this patent is extended or adjusted under 35 U.S.C. 154(b) by 705 days.

(21) Appl. No.: 12/643,533

(22) Filed: Dec. 21, 2009

(65) Prior Publication Data

US 2011/0150033 A1   Jun. 23, 2011

(51) Int. Cl.
*G01K 7/00* (2006.01)
*G01K 1/00* (2006.01)
*G01K 13/00* (2006.01)
*G01K 1/14* (2006.01)
*G01K 13/02* (2006.01)
*G01K 1/08* (2006.01)

(52) U.S. Cl.
CPC .. *G01K 1/08* (2013.01); *G01K 1/14* (2013.01); *G01K 13/02* (2013.01)
USPC ............ 374/179; 374/208; 374/148; 374/141

(58) Field of Classification Search
USPC .................... 374/208, 148, 179, 141
See application file for complete search history.

(56) References Cited

U.S. PATENT DOCUMENTS

| | | | | |
|---|---|---|---|---|
| 3,531,993 A | * | 10/1970 | Karn | ............................. 136/230 |
| 4,265,603 A | * | 5/1981 | Chiyoda et al. | .................... 418/2 |
| 4,525,081 A | | 6/1985 | Myhre | |
| 4,859,076 A | | 8/1989 | Twerdochlib | |
| 5,413,467 A | | 5/1995 | Suzuki | |
| 5,675,118 A | * | 10/1997 | Kortvelyessy | ................ 136/234 |
| 6,238,089 B1 | * | 5/2001 | Vodzak et al. | ................ 374/208 |
| 6,470,739 B1 | | 10/2002 | Matsumura et al. | |
| 7,004,626 B1 | | 2/2006 | Giberson et al. | |
| 7,060,949 B1 | * | 6/2006 | Davis et al. | .................... 219/536 |
| 7,316,546 B2 | | 1/2008 | Daniels et al. | |
| 7,467,891 B2 | | 12/2008 | Gennissen et al. | |
| 2005/0072253 A1 | | 4/2005 | Scott et al. | |
| 2007/0121701 A1 | * | 5/2007 | Gennissen et al. | ............ 374/143 |

FOREIGN PATENT DOCUMENTS

| | | |
|---|---|---|
| JP | 08136353 A | 5/1996 |
| JP | 11165680 A | 6/1999 |
| JP | 2000121474 A | 4/2000 |
| JP | 2000155055 A | 6/2000 |

(Continued)

OTHER PUBLICATIONS

International Search Report and written opinion issued in connection with corresponding application No. PCT/US2010/05506 on Feb. 2, 2011.

(Continued)

*Primary Examiner* — Mirellys Jagan
(74) *Attorney, Agent, or Firm* — Global Patent Operation (57) ABSTRACT

Methods and thermowell systems that can be uses in high dynamic pressure environments. A thermocouple system includes a thermowell configured to enter a structure through which a medium flows; an elongated probe provided partially inside the thermowell and configured to measure a temperature; at least one o-ring disposed around the elongated probe at a first end, the o-ring being configured to dampen a vibration for the elongated probe by contacting the thermowell; and an elastomer disposed around the elongated probe section at a second end, the elastomer being configured to dampen the vibration for the elongated probe by contacting the thermowell.

22 Claims, 7 Drawing Sheets

(56) References Cited

FOREIGN PATENT DOCUMENTS

| | | |
|---|---|---|
| JP | 2007147616 A | 6/2007 |
| JP | 2008241599 A | 10/2008 |
| JP | 2009042138 A | 2/2009 |
| JP | 2010066123 A | 3/2010 |

OTHER PUBLICATIONS

Unofficial English translation of a JP Notice of Allowance issued Mar. 25, 2014 in connection with corresponding JP Application No. 2012-545945.

* cited by examiner

FATIGUE RESISTANT THERMOWELL AND METHODS

TECHNICAL FIELD

The embodiments of the subject matter disclosed herein generally relate to thermocouples and thermowells, and more particularly to fatigue resistant thermocouple thermowell combinations.

BACKGROUND

Thermocouples are devices which are used for measuring temperatures based upon an electrical measurement. Thermocouples have a wide use in a variety of industries and environments today. Due to the various industries and environments in which thermocouples are used, various forms of thermocouples can be found. A generic thermocouple is now described with respect to FIG. 1.

Figure 1:
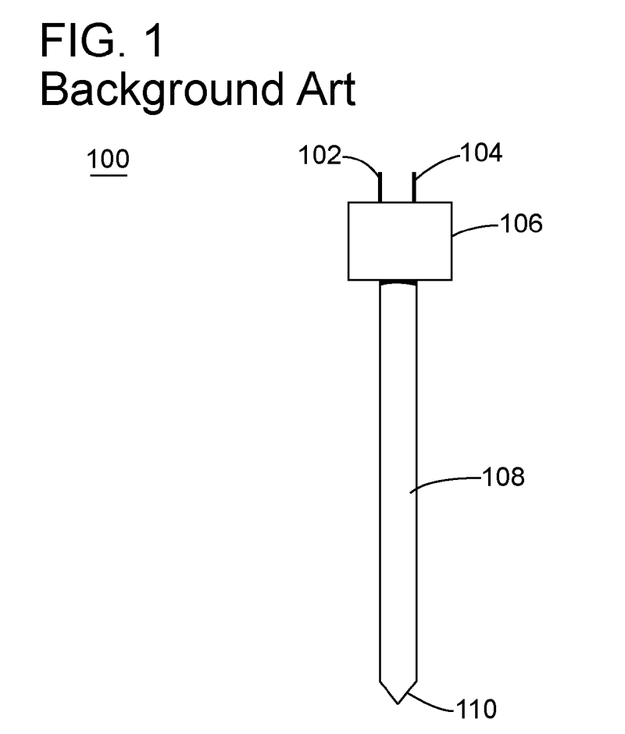
FIG. 1 depicts a traditional thermocouple.

FIG. 1 shows a thermocouple 100 which includes electrical junctions 102 and 104, a housing 106 and a probe (also known as a stinger) 108. A tip 110 of the probe 108 is typically placed near a point at which a temperature value is to be measured. A measuring device (not shown) is usually connected to the electrical junctions 102 and 104 for reading a voltage. From this voltage measurement, the temperature value at the tip 110 of the probe 108 is ascertained. Depending upon the use environment of the thermocouple 100, it is sometimes desirable to provide the thermocouple 100 with protection from the environment in which the temperature is to be measured. The protective piece used can be a thermowell.

Figure 2:
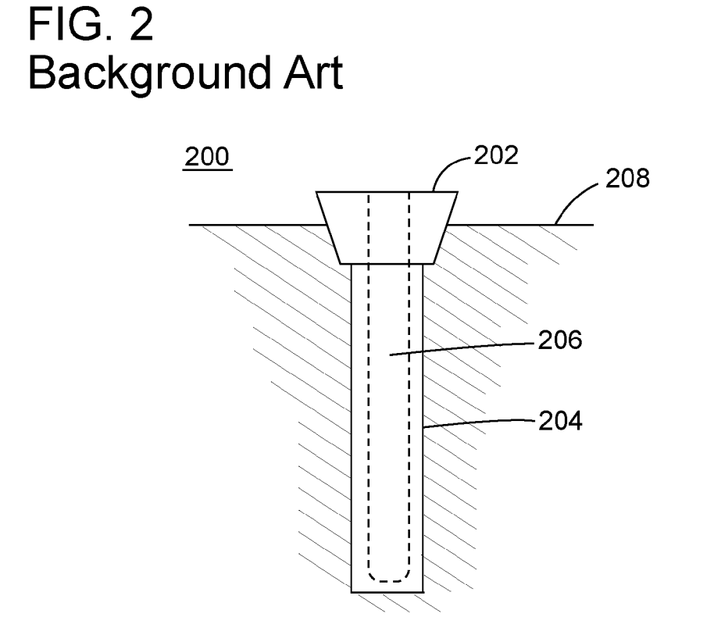
FIG. 2 illustrates a traditional thermowell.

A generic thermowell 200 is now described with respect to FIG. 2. Thermowell 200 can be mounted to or inserted into a housing 208 of a device to protect thermocouple 100 while still allowing the thermocouple 100 access to the desired location for obtaining an accurate temperature measurement. Thermowell 200 can include a cap piece 202 which mates with and seals off (if needed) the housing 208. The thermowell 200 also includes a body 204 and a cavity 206 in which the probe section 108 of the thermocouple 100 can be inserted.

Thermocouples 100 and thermowells 200 are generally off the shelf components, often for use with one another, used in various temperature obtaining applications. However, in some cases, these off the shelf components are not able to withstand environmental conditions for which obtaining the temperature is desired. For example, the probe 108 can experience mechanical failure at its base if it undergoes enough motion caused by, for example, vibration of the housing 208. In other words, a mechanical connection between the thermocouple 100 and the thermowell 200 makes a portion of the thermocouple 100 to vibrate at a same frequency as the housing 208 while another portion, e.g., 110, of the thermocouple 100, which is free to move, exerts continuous stress on the fixed portion, thus resulting in fractures of the thermocouple 100.

Accordingly, systems and methods for using thermocouples with thermowells under various operating conditions are desirable.

SUMMARY

According to an exemplary embodiment there is a thermocouple system which includes: a thermowell configured to enter a structure through which a medium flows; an elongated probe provided partially inside the thermowell and configured to measure a temperature; at least one o-ring disposed around the elongated probe at a first end, the o-ring being configured to dampen a vibration for the elongated probe by contacting the thermowell; and an elastomer disposed around the elongated probe section at a second end, the elastomer being configured to dampen the vibration for the elongated probe by contacting the thermowell.

According to another exemplary embodiment there is a compressor which includes: a thermowell configured to enter a wall of the compressor along which a medium flows; an elongated probe provided and configured to measure a temperature; at least one o-ring disposed around the elongated probe at a first end, the o-ring being configured to dampen a vibration for the elongated probe by contacting the thermowell; and an elastomer disposed around the elongated probe section at a second end, the elastomer being configured to dampen the vibration for the elongated probe by contacting the thermowell; an intake section being configured to receive the medium; a shaft and rotor assembly configured to rotate and initiate compression of the medium received from the intake section; and an outlet section being configured to discharge the medium.

According to still another exemplary embodiment there is a method for dampening vibrations of a thermocouple system. The method includes: providing an elastomer in a housing piece, where the elastomer surrounds a first end of an elongated probe section of the thermocouple system, and where the elongated probe section is configured to measure a temperature; disposing at least one o-ring around a second end of the elongated probe section of the thermocouple system; disposing a dampening fluid within a housing of a thermowell in which the elongated probe section is provided; and inserting the elongated probe section of the thermocouple into the thermowell. The elastomer, the at least one o-ring and the dampening fluid reduce vibrations of the thermocouple.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

As described in the Background section, thermocouples can be used with thermowells to obtain temperature measurements in various environments in which a thermocouple is not used by itself. However, in some environments, these off the shelf components fail, e.g., mechanical fracture of the thermocouple probe. Therefore, according to exemplary embodiments, systems and methods for preventing failure of the thermocouple system, i.e., a thermocouple used with a thermowell, in difficult environments are desirable and obtainable as discussed next. One example of a difficult environment in which a thermocouple thermowell combination has been known to fail, is an environment which has a high dynamic pressure, e.g., 300 +/−50 psi (20.68 +/−3.45 bar). Alternatively, other high dynamic pressure ranges, e.g., +/−500 psi (+/−34.5 bar), can be used. The pressure range can depend upon operating conditions. This high dynamic pressure can cause vibrations and have a structural resonance which may be at a frequency that allows additional vibration for a thermocouple system which in turn causes mechanical failure of the thermocouple.

Figure 3:
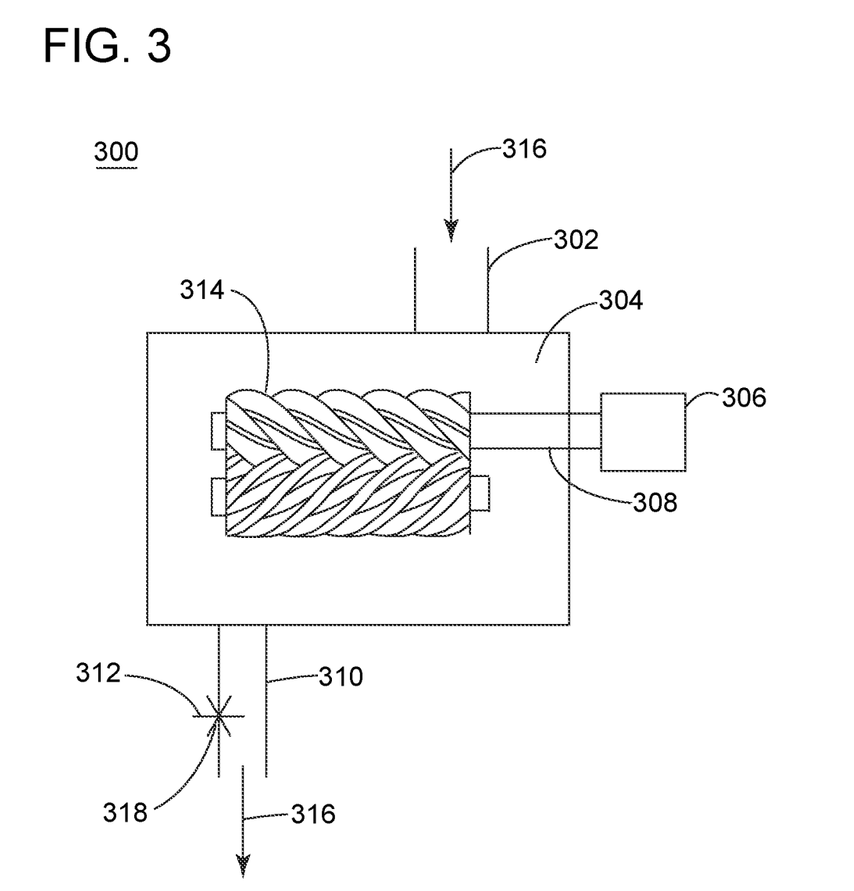
FIG. 3 shows an oil free screw compressor according to exemplary embodiments.

According to exemplary embodiments, an oil free screw compressor 300, as shown in FIG. 3, can exhibit a high dynamic pressure. The oil free screw compressor 300 includes an air gas intake section 302 for channeling air (or other medium) to a compression chamber 304 and a motor driver 306 attached to a shaft 308. The compression chamber 304 also includes screws 314, one of which is attached to the shaft 308 for initiating compression. Additionally, a pressurized air gas exhaust section 310 allows exit of pressurized air gas from the compression chamber and a thermocouple system 312 for measuring a temperature. Arrows 316 show the direction of air gas travel. Reference sign "X" 318 represents a spot where mechanical failure occurs if a traditional thermocouple in a thermowell were used in this type system with a high dynamic pressure, i.e., the thermocouple 100 tended to mechanically fail at the junction with the cap piece 106 to the probe section 108 which approximately corresponds to the piercing of the thermowell 200 into the pressurized gas exhaust section 310 (using a traditional thermocouple 100 and a traditional thermowell 200). Additionally, thermocouples 100 and thermowells 200 can fail at any connection point as well as the thermocouple probe section 108.

According to exemplary embodiments, thermocouple systems 312 which survive in high dynamic pressure environments are described below with respect to FIGS. 4 and 5. Also, while an oil free screw compressor 300 is shown in FIG. 3, other compressors (and other devices) which have a high dynamic pressure, e.g., positive displacement compressors and reciprocating compressors, can be used in these exemplary embodiments. Additionally, other components can be included in the oil free screw compressor 300 but are not shown here for simplification.

Figure 4:
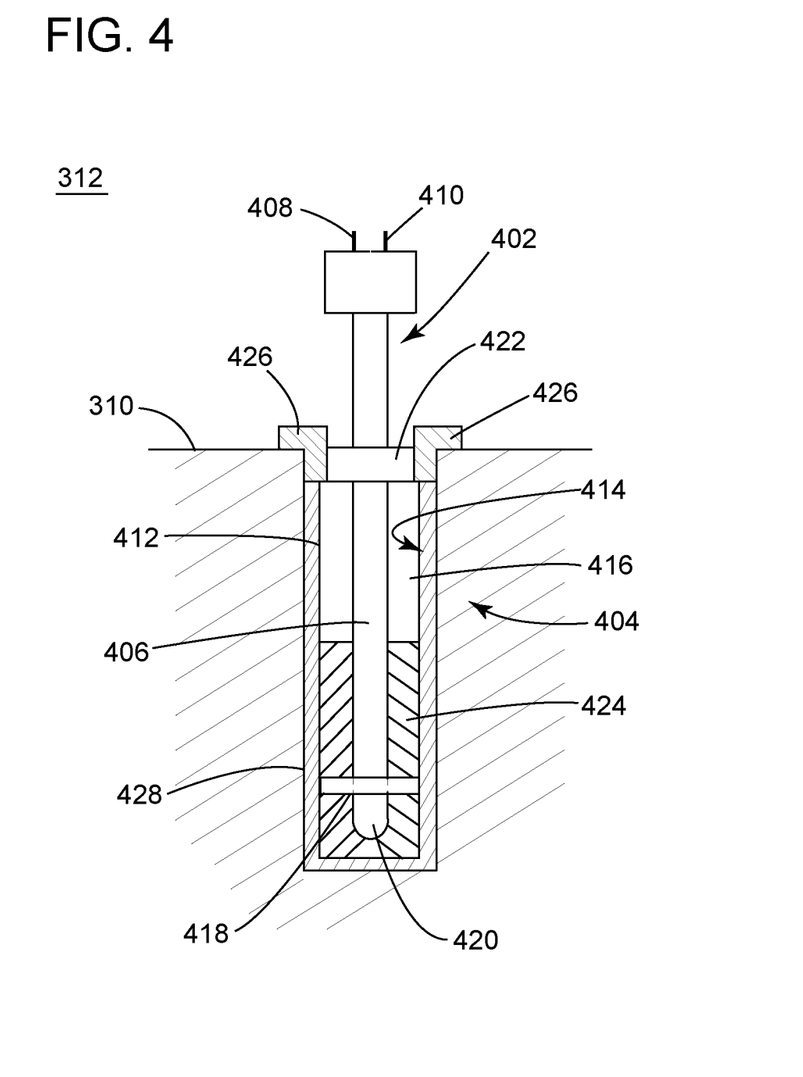
FIG. 4 illustrates a thermocouple system according to exemplary embodiments.

According to an exemplary embodiment, the thermocouple system 312 as shown in FIG. 4 can be used in high dynamic pressure environments. The thermocouple system 312 includes a thermocouple 402 and a thermowell 404. The thermocouple 402 includes an elongated probe section 406 and electrical junctions 408 and 410. The thermowell 404 is mounted to the pressurized air exhaust 310 and includes a solid shell (or housing) 412 which has an inner wall 414, a cavity 416, a cap section 426 and a stem section 428. An o-ring 418 may be disposed on the elongated probe section 406 such that the o-ring has contact with the inner wall 414, however the contact is loose enough such that fluid, if placed in the cavity 416, may pass, i.e., the o-ring 418 does not provide a fluid seal between the elongated probe section 406 and the inner wall 414. The o-ring 418 is located generally near a tip 420 of the elongated probe 406 but may be placed in other locations in alternative exemplary embodiments. An elastomer 422 may be displaced around the elongated probe section 406 and contacts the cap section 426. Additionally, a dampening fluid 424 may be disposed in the cavity 416. The stem section 428 may have a length between 10.16 cm and 53.35 cm and an inner diameter between 0.635 cm and 1.27 cm, however other sizes may be used depending upon the thermocouple 402 and the environment as desired.

As described above, operation of the compressors 300 can cause vibration. This vibration allows for motion in a thermocouple/thermowell which can lead to mechanical failure, e.g., a snapping of the probe section or thermowell. The vibration may be caused by the high dynamic pressure/acoustical resonance within the system or by a structural resonance which, when in a frequency range of the thermocouple system 312, increases the vibration of the thermocouple 402 or thermowell assembly 404. The exemplary thermocouple system 312 shown in FIG. 4 is less likely to fail in the high dynamic pressure environments of the compressor 300. This exemplary thermocouple system 312 includes the use of the o-ring 418 and the elastomer 422 which reduce vibration by being in contact with the elongated probe section 406 and other structural elements. The elastomer 422 is displaced tightly enough around the elongated probe section to dampen vibration, but not so tightly as to directly transmit the structural resonance of the compressor 300 to the elongated probe section 406. In other words, the elastomer 422 may alter or provide dampening to a frequency transmitted from the compressor to the thermocouple 402.

The addition of the o-ring 418 and the elastomer 422 to the probe section 406 additionally changes the frequency of the thermocouple 402 such that the frequency of the thermocouple 402 is outside the range of frequencies generated by the compressor 300 which would induce additional vibrational motion. The addition of the o-ring 418 and the elastomer 422 can also provide damping such that if the probe section 406 was still at a resonant frequency the excitation of the frequency would be reduced. Additionally, the dampening fluid 424 may be added to further reduce vibrations. For example, the dampening fluid 424 may fill up to one half of the volume of the cavity of the stem section 428 of the thermowell 404. This dampening fluid 424 may be an oil with a high thermoconductivity and a flash point greater than the expected operating temperatures, e.g., having a flash point greater than 176.7° C. However, other quantities and types of dampening fluid 424 may be used.

Figure 5:
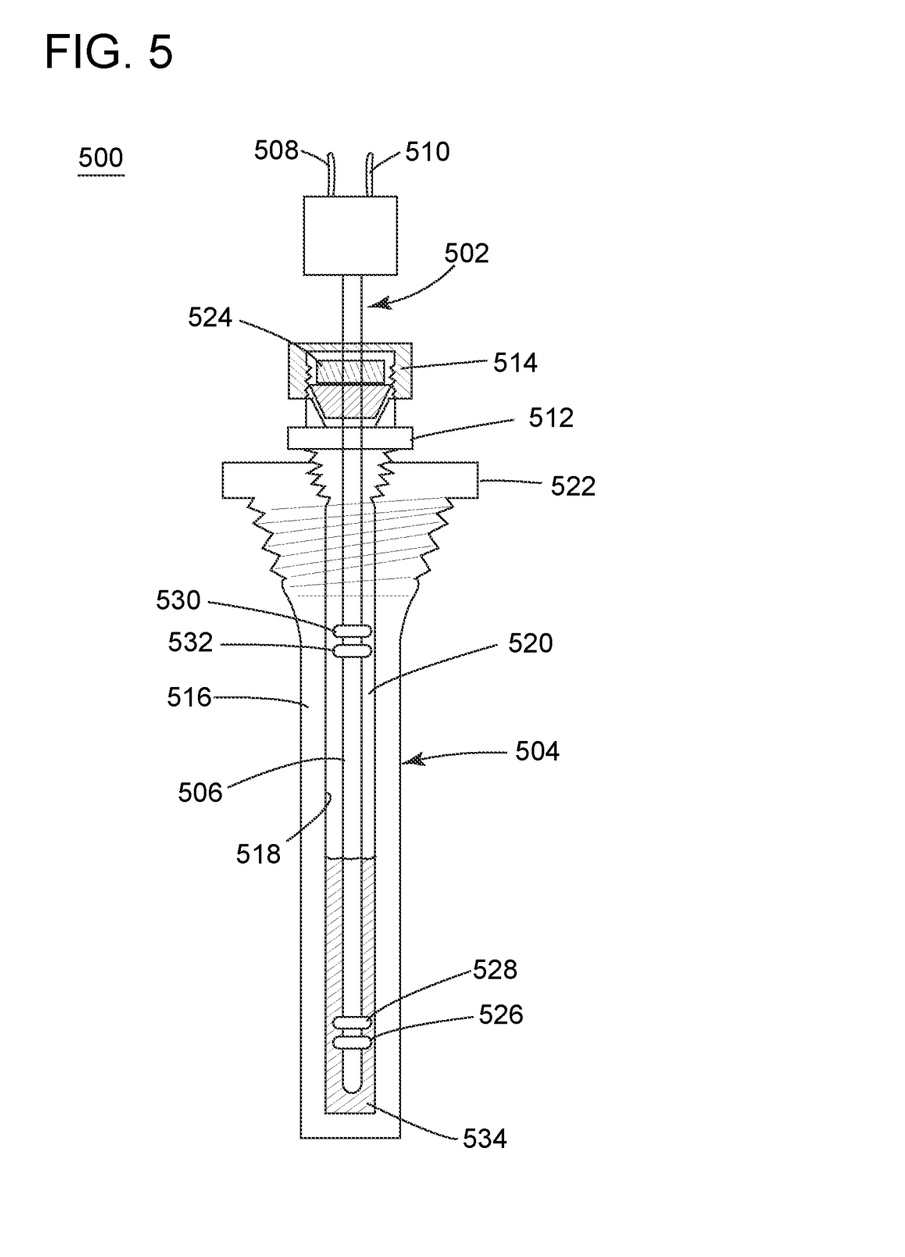
FIG. 5 shows another thermocouple system according to exemplary embodiments.

According to another exemplary embodiment, another thermocouple system 500 is shown in FIG. 5 and can be used in high dynamic pressure environments. The thermocouple system 500 includes a thermocouple 502 and a thermowell 504. The thermocouple 502 includes an elongated probe section 506, electrical junctions 508 and 510, a cap section 512 and a dampening section 514. The cap section 512 is used for attaching the thermocouple 502, e.g., via threads, to the thermowell 504. While this attaches the thermocouple 502 to the thermowell 504 in an exemplary embodiment the probe section 506 is not in direct contact with the thermowell 504. The dampening section 514 includes an elastomer 524 which is disposed around the elongated probe section 506 and contacts both the elongated probe section 506 and the dampening section 514. The thermowell 504 is mounted to a structure where a temperature of a media is to be measured, e.g., the pressurized exhaust section 310 of the compressor 300, and includes a solid shell (or housing) 516 which has an inner wall 518, a cavity 520 and a mounting section 522. O-rings 526, 528, 530 and 532 are disposed on the elongated probe section 506 such that the o-rings 526, 528, 530 and 532 may have contact with the inner wall 518 especially if the elongated probe section 506 experiences slight movement. However, if contact exists, the contact is loose enough such that fluid, if placed in the cavity 520 may pass, i.e., the o-rings 526, 528, 530 and 532 do not provide a fluid seal between the elongated probe section 506 and the inner wall 518. The o-rings 526, 528, 530 and 532 are spaced along the elongated probe section to prevent excess motion of the elongated probe section 506 that would result in mechanical failure of the elongated probe section 506. While four o-rings 526, 528, 530 and 532 are shown in FIG. 5, more or fewer may be used. This exemplary thermocouple system 500 reduces vibrations and alters the frequency of the thermocouple 502 in a manner similar to that as described above for the thermocouple system 312 as shown in FIG. 4.

Figure 6:
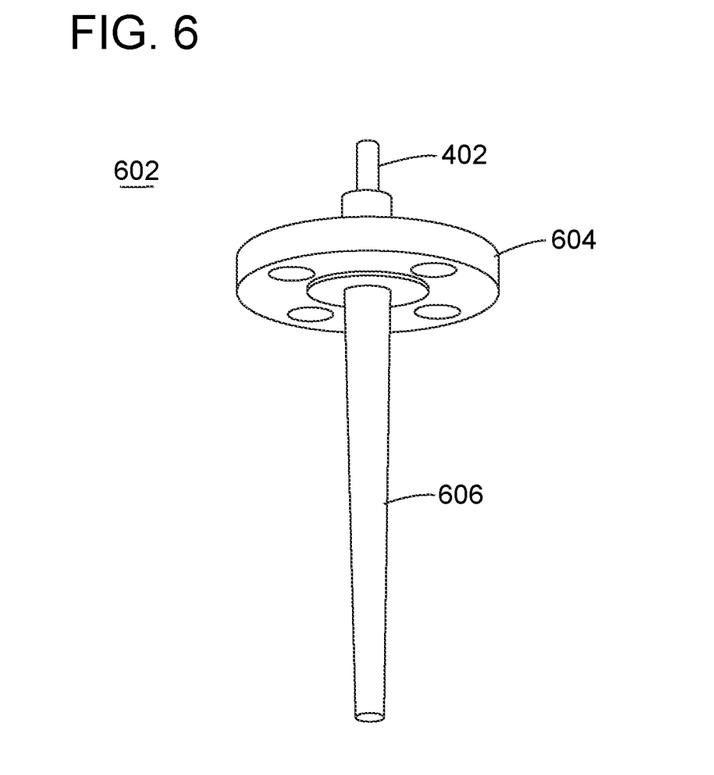
FIGS. 6-8 shows thermowells according to exemplary embodiments.
Figure 7:
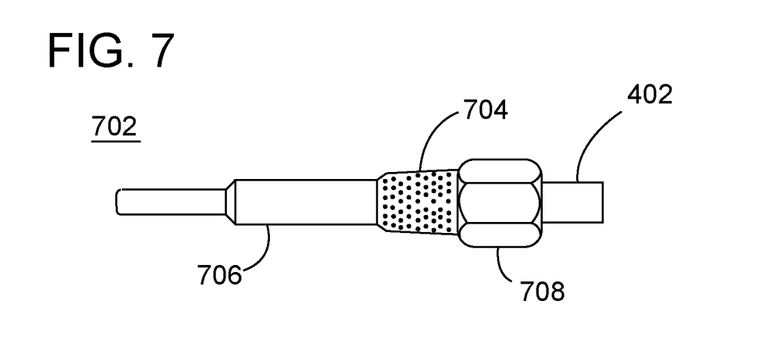
Figure 8:
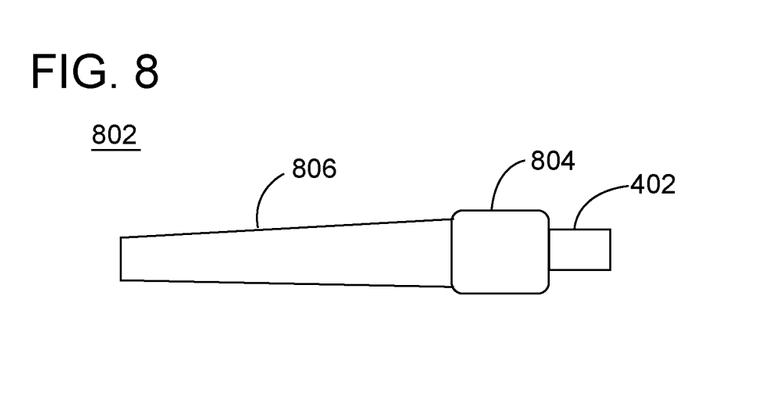

According to exemplary embodiments, various types of thermowells can be used in the exemplary thermocouple systems described above as shown in FIGS. 6-8. According to one exemplary embodiment, as shown in FIG. 6, a flanged thermowell 602 can be used. The flanged thermowell 602 includes a flanged section 604 for mating with and sealing off a surface associated with, e.g., the pressurized air exhaust section 310, through which a housing section 606 passes. According to another exemplary embodiment, a threaded thermowell 702 includes a cap section 708 and a threaded section 704 for mating with and sealing off a surface associated with, e.g., the pressurized air exhaust section 310, through which a housing section 706 passes. According to yet another exemplary embodiment, a weld-in thermowell 802 includes a cap section 804 and a housing 806. The weld-in thermowell 802 is welded to the location where a temperature is to be measured, and attached via welding which also seals the pierced surface.

Figure 9:
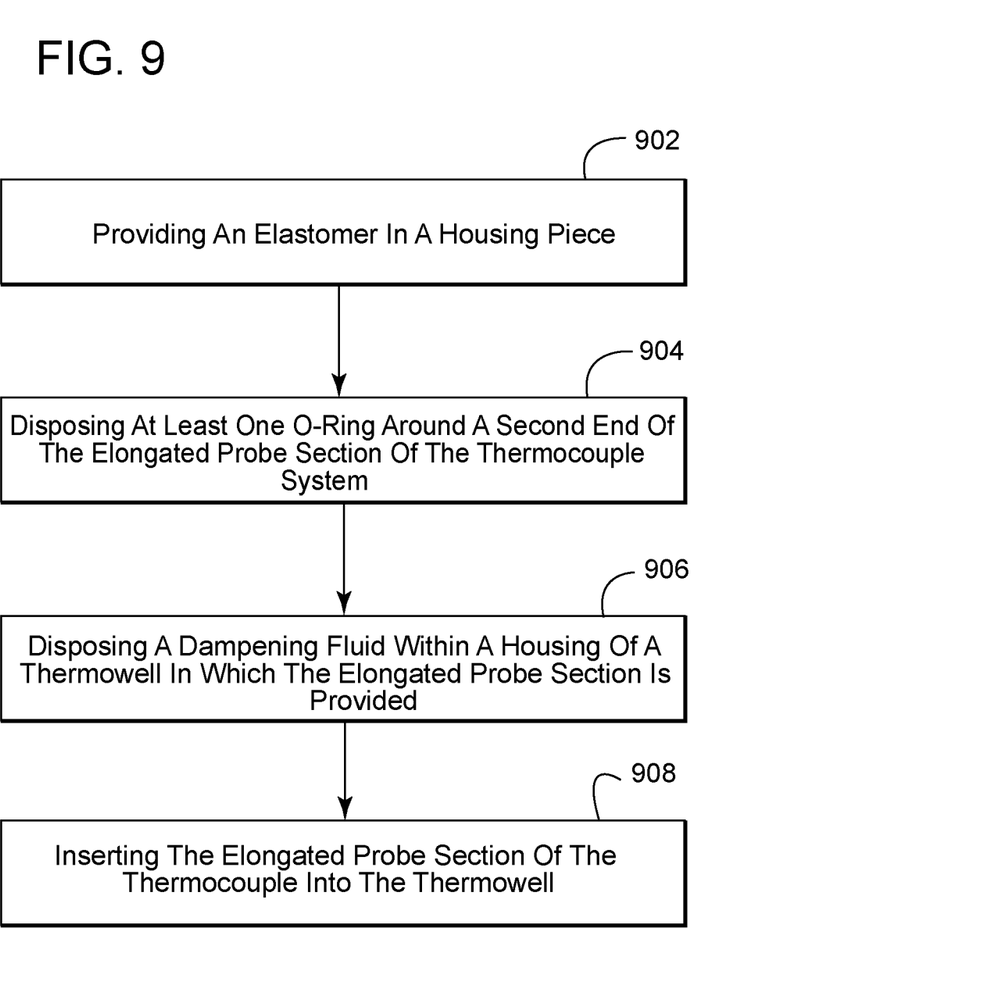
FIG. 9 is a flowchart for a method for dampening vibrations according to exemplary embodiments.

Utilizing the above-described exemplary systems according to exemplary embodiments, a method for dampening vibrations is shown in the flowchart of FIG. 9. A method for dampening vibrations in a thermocouple system includes: at step 902 providing an elastomer in a housing piece, wherein the elastomer surrounds a first end of an elongated probe section of the thermocouple system, and wherein the elongated probe section is configured to measure a temperature; at step 904 disposing at least one o-ring around a second end of the elongated probe section of the thermocouple system; at step 906 disposing a dampening fluid within a housing of a thermowell in which the probe is provided; and at step 908 inserting the elongated probe section of the thermocouple into the thermowell, where the elastomer, the at least one o-ring and the dampening fluid reduce vibrations of the thermocouple.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A thermocouple system, comprising:
   a thermowell configured to enter a structure through which a medium flows;
   an elongated probe section of a thermocouple provided partially inside the thermowell and configured to measure a temperature;
   at least one o-ring disposed on and in contact with the elongated probe section of the thermocouple at a first end, the o-ring being configured to dampen a vibration for the thermocouple by contacting the thermowell, wherein the contact between the o-ring and the elongated probe section is loose, such that a dampening fluid is able to flow passed the o-ring and into the thermowell; and
   an elastomer disposed around the elongated probe section of the thermocouple at a second end, the elastomer being configured to dampen the vibration for the thermocouple by contacting the thermowell.

2. The thermocouple system of claim 1, wherein the thermowell is selected from a group comprising flanged thermowells, weld-in thermowells and threaded thermowells.

3. The thermocouple system of claim 1, further comprising: a second o-ring provided away from the first end.

4. The thermocouple system of claim 1, wherein the dampening fluid is disposed in the thermowell.

5. The thermocouple system of claim 1, further comprising:
   a cap section configured to connect the elongated probe section of the thermocouple to the thermowell via the elastomer so that a vibrational frequency of the thermocouple is different from a resonating frequency of the structure.

6. The thermocouple system of claim 1, wherein the thermowell of the thermocouple system is exposed to the medium for of which temperature is measured.

7. The thermocouple system of claim 1, the thermowell further comprising:
   a housing which includes a stem section which is in contact with the medium, the stem section having a length in a range of 10.16-53.35 cm, and an inner diameter in a range of 0.635-1.27 cm.

8. The thermocouple system of claim 7, wherein an amount of a dampening fluid disposed inside of the stem section fills approximately one half of a volume within the stem section after the probe has been inserted into said housing.

9. The thermocouple system of claim 8, wherein the dampening fluid is a thermoconductive oil with a flash point over 176.7° C.

10. A compressor comprising:
    a thermowell configured to enter a wall of the compressor along which a medium flows;
    an elongated probe of a thermocouple provided and configured to measure a temperature;
    at least one o-ring disposed on and in contact with the elongated probe section of the thermocouple at a first end, the o-ring being configured to dampen a vibration for the thermocouple by contacting the thermowell, wherein the contact between the o-ring and the elongated probe section is loose, such that a dampening fluid is able to flow passed the o-ring and into the thermowell; and an elastomer disposed around the elongated probe section of the thermocouple at a second end, the elastomer being configured to dampen the vibration for the thermocouple by contacting the thermowell;

an intake section being configured to receive the medium;

a shaft and rotor assembly configured to rotate and initiate compression of the medium received from the intake section; and an outlet section being configured to discharge the compressed medium.

11. The compressor of claim 10, wherein the thermowell is selected from a group comprising flanged thermowells, weld-in thermowells and threaded thermowells.

12. The compressor of claim 10, further comprising: a second o-ring provided away from the first end.

13. The compressor of claim 10, further comprising:

a cap section configured to connect the elongated probe of the thermocouple to the thermowell via the elastomer so that a vibrational frequency of the thermocouple is different from a resonating frequency of the structure.

14. The compressor of claim 10, wherein the thermowell is exposed to the medium for of which temperature is measured.

15. The compressor of claim 10, the thermowell further comprising:

a housing which includes a stem section which is in contact with the medium, the stem section having a length in a range of 10.16-53.34 cm, and an inner diameter in a range of 0.635-1.27 cm.

16. The compressor of claim 15, wherein an amount of the dampening fluid disposed inside of said stem section fills approximately one half of a volume within said stem section after the probe has been inserted into said housing.

17. The compressor of claim 16, wherein the dampening fluid is a thermoconductive oil with a flash point over 350° F.

18. A method for dampening vibrations of a thermocouple system, the method comprising:

providing an elastomer in a housing piece, wherein the elastomer surrounds a first end of an elongated probe section of the thermocouple, and wherein the elongated probe section of the thermocouple is configured to measure a temperature of a medium contacting the thermocouple system;

disposing at least one o-ring on and in contact with a second end of the elongated probe section of the thermocouple;

disposing a dampening fluid within a housing of a thermowell in which the elongated probe section of the thermocouple is provided; and inserting the elongated probe section of the thermocouple into the thermowell, wherein the elastomer, the at least one o-ring and the dampening fluid reduce vibrations of the thermocouple, and wherein the contact between the o-ring and the elongated probe section is loose, such that the dampening fluid is able to flow passed the o-ring and into the thermowell.

19. The method of claim 18, further comprising:

selecting the thermowell from a group comprising flanged thermowells, weld-in thermowells and threaded thermowells.

20. The method of claim 18, further comprising:

providing a second o-ring on the elongated probe section of the thermocouple away from the first o-ring.

21. The method of claim 18, wherein the housing section includes a stem section which is in contact with the medium, the stem section having a length in a range of 10.16-53.34 cm, and an inner diameter in a range of 0.635-1.27 cm.

22. The method of claim 18, further comprising:

altering a frequency of the thermocouple system such that the frequency of the thermocouple is a different from a resonating frequency of a structure to which the thermowell is attached.

* * * * *